(12) United States Patent
Verma et al.

(10) Patent No.: US 11,537,310 B2
(45) Date of Patent: Dec. 27, 2022

(54) THREADING OF REPLICATION BASED ON DATA TYPE

(71) Applicant: Microsoft Technology Licensing, LLC, Redmond, WA (US)

(72) Inventors: Deepak Verma, Redmond, WA (US); Kesavan Shanmugam, Redmond, WA (US); Michael Gregory Montwill, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 17/169,248

(22) Filed: Feb. 5, 2021

(65) Prior Publication Data
US 2022/0253217 A1    Aug. 11, 2022

(51) Int. Cl.
G06F 3/06    (2006.01)
G06F 9/38    (2018.01)

(52) U.S. Cl.
CPC ............ G06F 3/065 (2013.01); G06F 3/0604 (2013.01); G06F 3/0683 (2013.01); G06F 9/3851 (2013.01)

(58) Field of Classification Search
CPC ...... G06F 3/065; G06F 3/0604; G06F 3/0683; G06F 9/3851
See application file for complete search history.

(56) References Cited

U.S. PATENT DOCUMENTS

| | | | |
|---|---|---|---|
| 7,870,355 B2 * | 1/2011 | Erofeev | G06F 16/27 711/147 |
| 7,913,206 B1 | 3/2011 | Cadouri | |
| 8,275,976 B2 | 9/2012 | Glew | |
| 8,370,542 B2 * | 2/2013 | Lu | G06F 3/0686 710/33 |
| 9,442,674 B1 | 9/2016 | Andre et al. | |
| 9,672,126 B2 | 6/2017 | Dewall et al. | |

(Continued)

FOREIGN PATENT DOCUMENTS

| WO | 2018136963 A1 | 7/2018 |
|---|---|---|
| WO | 2020028618 A1 | 2/2020 |

OTHER PUBLICATIONS

"Improving Redis Performance through Multi-Thread Processing", Retrieved from: https://www.alibabacloud.com/blog/improving-redis-performance-through-multi-thread-processing_594150, Nov. 7, 2018, 10 Pages.

(Continued)

*Primary Examiner* — Eric Cardwell
(74) *Attorney, Agent, or Firm* — Workman Nydegger

(57) ABSTRACT

Replication of data from a primary computing system to a secondary computing system. The replication is single-threaded or multi-threaded depending on one or more characteristics of the data to be replicated. As an example, the characteristics could include the type of data being replicated and/or the variability on that data. Also, the multi-threading capabilities of the primary and secondary computing systems are determined. Then, based on the identified one or more characteristics of the data, the primary computing system decides whether to perform multi-threaded replication and the multi-threading parameters of the replication based on the one or more characteristics of that data, as well as on the multi-threading capabilities of the primary and secondary computing system.

21 Claims, 9 Drawing Sheets

(56) References Cited

U.S. PATENT DOCUMENTS

| | | |
|---|---|---|
| 9,854,037 B2 | 12/2017 | Murrish et al. |
| 10,719,531 B2 | 7/2020 | Rosier et al. |
| 2007/0185852 A1 | 8/2007 | Erofeev et al. |
| 2009/0292745 A1 | 11/2009 | Bose et al. |
| 2013/0132345 A1 | 5/2013 | Chen et al. |
| 2021/0117289 A1* | 4/2021 | Lin .................... G06F 11/1469 |

OTHER PUBLICATIONS

Ooi, et al., "Scalability of Database Bulk Insertion with Multithreading", In Proceedings of International Conference on Software Engineering and Computer Systems, Jun. 27, 2011, 14 Pages.

Yegulalp, Serdar, "Redis 6 arrives with multithreading for faster I/O", Retrieved from: https://www.infoworld.com/article/3541356/redis-6-arrives-with-multithreading-for-faster-io.html, Apr. 30, 2020, 4 Pages.

"International Search Report & Written Opinion issued in PCT Application No. PCT/US22/013022", dated May 17, 2022, 10 Pages.

* cited by examiner

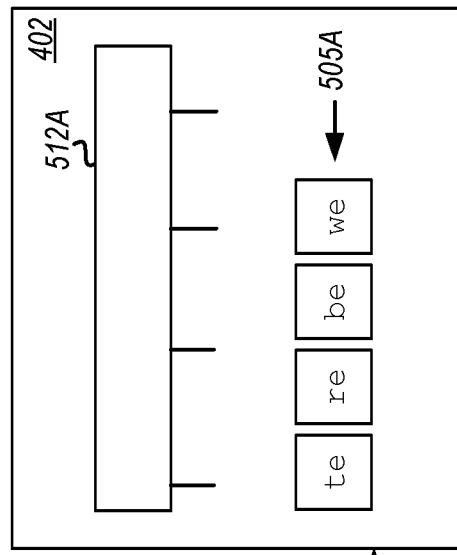
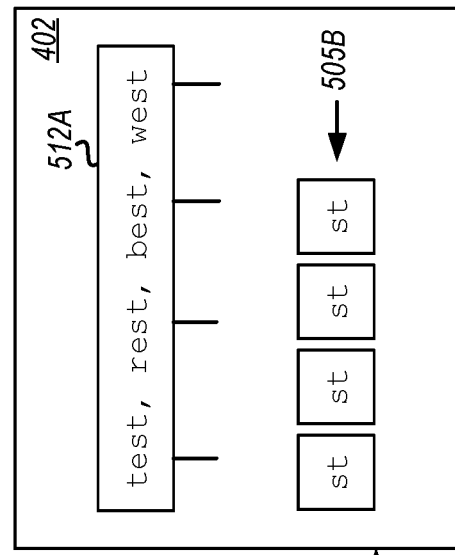
FIG. 5A
FIG. 5B

THREADING OF REPLICATION BASED ON DATA TYPE

BACKGROUND

In order to ensure highly available computing systems, it is common to provide computing system functionality in the form of both a primary computing system, and one or more replica computing systems. This ensures that the computing system functionality is highly available. As an example, in a cloud computing environment, each of these computing systems could be distinct virtual machines running in the cloud. The primary computing system responds to requests (from a user or an application) to thereby alter the data on the primary computing system. Meanwhile, the data on the primary computing system is replicated to the replica computing systems. That way, if the primary computing system ever ceases to operate properly, one of the replica computing systems can then take over as the new primary computing system, thereafter itself responding to the requests. From the viewpoint of the entity making the requests, the entity may not even know that the primary computing system has been replaced.

There are two broad types of replication—incremental replication and full replication. In incremental replication, each time data on the primary computing system changes, a change instruction is provided to the replica computing system(s) (though sometimes change instructions can accumulate for a short time for efficiency in transfer). Thus, the data on the replica computing system(s) is updated incrementally in relative real-time, as changes are made on the primary computing system.

On the other hand, a full replication operation involves all of the data on the primary computing system being replicated in a large data transfer to a replica computing system. Full replication is appropriate where the replica computing system is being started up, or if the replica computing system has lost all of its data. As an example, if the data on the replica computing system is represented in volatile memory, a full replication would be performed upon powering up a replica computing system after a power cycle. Full replications of large amounts of data can take significant time, computing resources, and network bandwidth.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the replication of data from a primary computing system to a secondary computing system. The replication is single-threaded or multi-threaded depending on one or more characteristics of the data to be replicated. As an example, the characteristics could include the type of data being replicated and/or the variability of that data. Also, the multi-threading capabilities of the primary and secondary computing systems are determined. Then, the primary computing system decides whether to perform multi-threaded replication and what the multi-threading parameters of the replication will be based on the one or more characteristics of that data, as well as based on the multi-threading capabilities of the primary and secondary computing systems.

As an example, for data that can be partitioned into approximately equal size, multi-threaded replication is accomplished by assigning partitions to each of the threads. Corresponding threads at the secondary computing system gather the partitions. Furthermore, the secondary computing system assembles those partitions into the replicated data. Thus, multi-threaded replication allows for more rapid and efficient replication from the primary computing system to the secondary computing system. This is especially advantageous for full replication, in which large amounts of data are replicated. Full replication can thus be done in less time by tailoring the replication according to the nature of the data being replicated.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIGS. 5A and 5B illustrate a sequence of transfers from the primary memory to the secondary memory that involves partitioning the buffer into multiple parts;

DETAILED DESCRIPTION

The principles described herein relate to the replication of data from a primary computing system to a secondary computing system. The replication is single-threaded or multi-threaded depending on one or more characteristics of the data to be replicated. As an example, the characteristics could include the type of data being replicated and/or the variability of that data. Also, the multi-threading capabilities of the primary and secondary computing systems are determined. Then, the primary computing system decides whether to perform multi-threaded replication and what the multi-threading parameters of the replication will be based on the one or more characteristics of that data, as well as based on the multi-threading capabilities of the primary and secondary computing systems.

As an example, for data that can be partitioned into approximately equal size, multi-threaded replication is accomplished by assigning partitions to each of the threads. Corresponding threads at the secondary computing system gather the partitions. Furthermore, the secondary computing system assembles those partitions into the replicated data. Thus, multi-threaded replication allows for more rapid and efficient replication from the primary computing system to the secondary computing system. This is especially advantageous for full replication, in which large amounts of data are replicated. Full replication can thus be done in less time by tailoring the replication according to the nature of the data being replicated.

Figure 1:
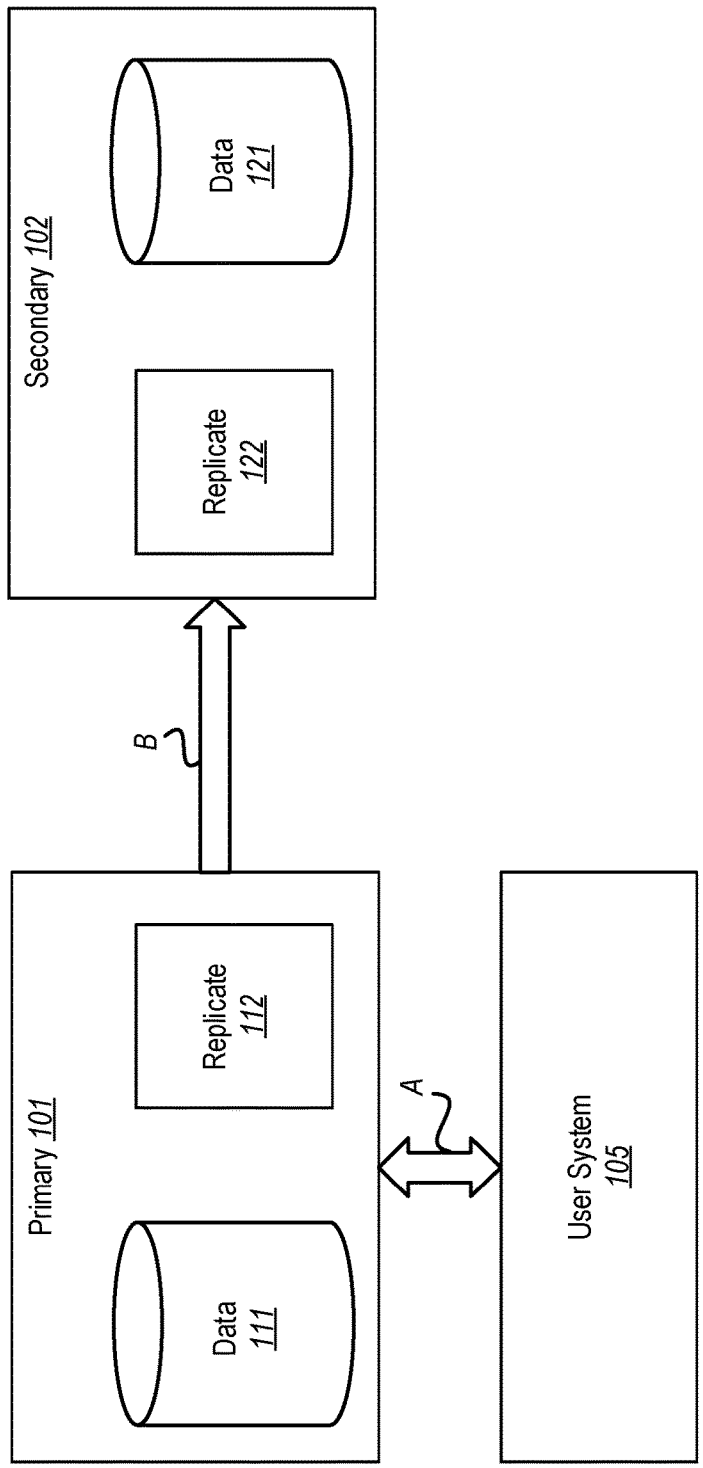
FIG. 1 illustrates an environment in which a primary computing system replicates its data to a secondary computing system, which replication may be performed in accordance with the principles described herein.

FIG. 1 illustrates an environment 100 in which the principles described herein may be employed. The environment 100 includes a primary computing system 101 (also called herein a "primary system" or simply "the primary") and a secondary computing system 102 (also called herein a "secondary system" or simply "the secondary"). The primary system 101 replicates its data to the secondary system 102.

As an example, the primary system 101 and the secondary system 102 may each be physical systems. Alternatively, one or both of the primary system 101 and the secondary system 102 may be a virtual machine thereby emulating a computing system. As an example, the primary system 101 and the secondary system 102 may be structured as described below for the computing system 800 or FIG. 8, or may be structured to emulate such a computing system. In addition, the replica component 112 on the primary system 101 and the replica component 122 on the secondary system 102 may each be structured as described below for the executable component 806 of FIG. 8.

As represented by bi-directional arrow A, the primary system 101 interfaces with a user computing system 105 (also called herein a "user system"). The primary system 101 receives requests from the user system 105, as appropriate provides responses or notifications to the user system 105, and as appropriate alters data 111 held by the primary system 101. Thus, the data 111 may be altered as the primary system 101 interfaces with the user system 105. Because of this interaction with the user system 105, the primary system 101 is modified by the term "primary".

On the other hand, the secondary system 102 is modified by the term "secondary" as it is not presently interfacing directly with the user system 105. Instead, the secondary system 102 stands at the ready to become primary in case the current primary system 101 is no longer available or has reduced functionality. To ensure that the secondary system 102 can do this, at least some of the data 111 on the primary system 101 is replicated (as represented by arrow B) to the data 121 on the secondary system 102. A replica component 112 on the primary system 101 and a replica component 122 on the secondary system collaborate to accomplish this replication.

The replication could be full replication of the data 110 from the primary system to the secondary system 120. That is, in full replication, a replication scope is defined, and all data within that replication scope on the primary system is replicated to the secondary system. As an example, the replication scope could be an address range, or perhaps could be a large piece of structured data, such as perhaps a database.

Figure 2:
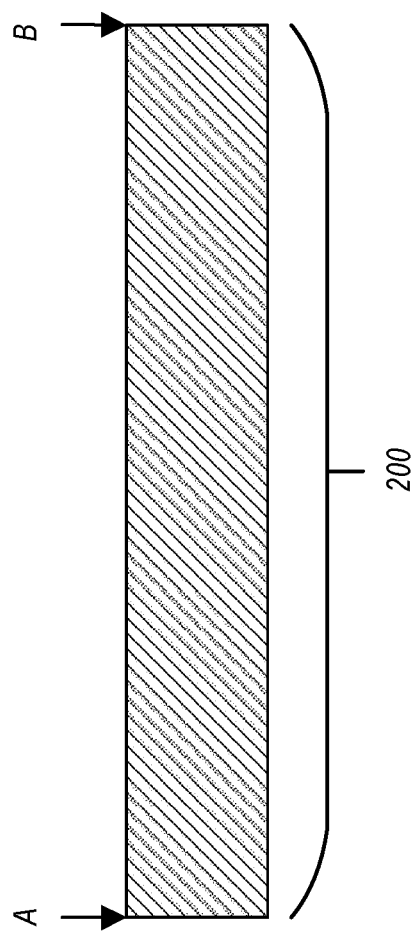
FIG. 2 illustrates an example of a data range that is to be replicated, in one example described herein.

FIG. 2 illustrates an example of a data range 200 that is to be replicated. In this example, the data range is represented linearly from A to B. The data range 200 will be referred to as an example of data to be replicated hereinafter. In the case of the secondary system 102 receiving a full replication of the primary system 101, the secondary system 102 may also be referred to as a "replica" system. Although the environment 100 illustrates replication occurring from a primary system to a single secondary system, the principles described herein may also be performed to replicate data from a primary computing system to multiple secondary computing systems.

Figure 3:
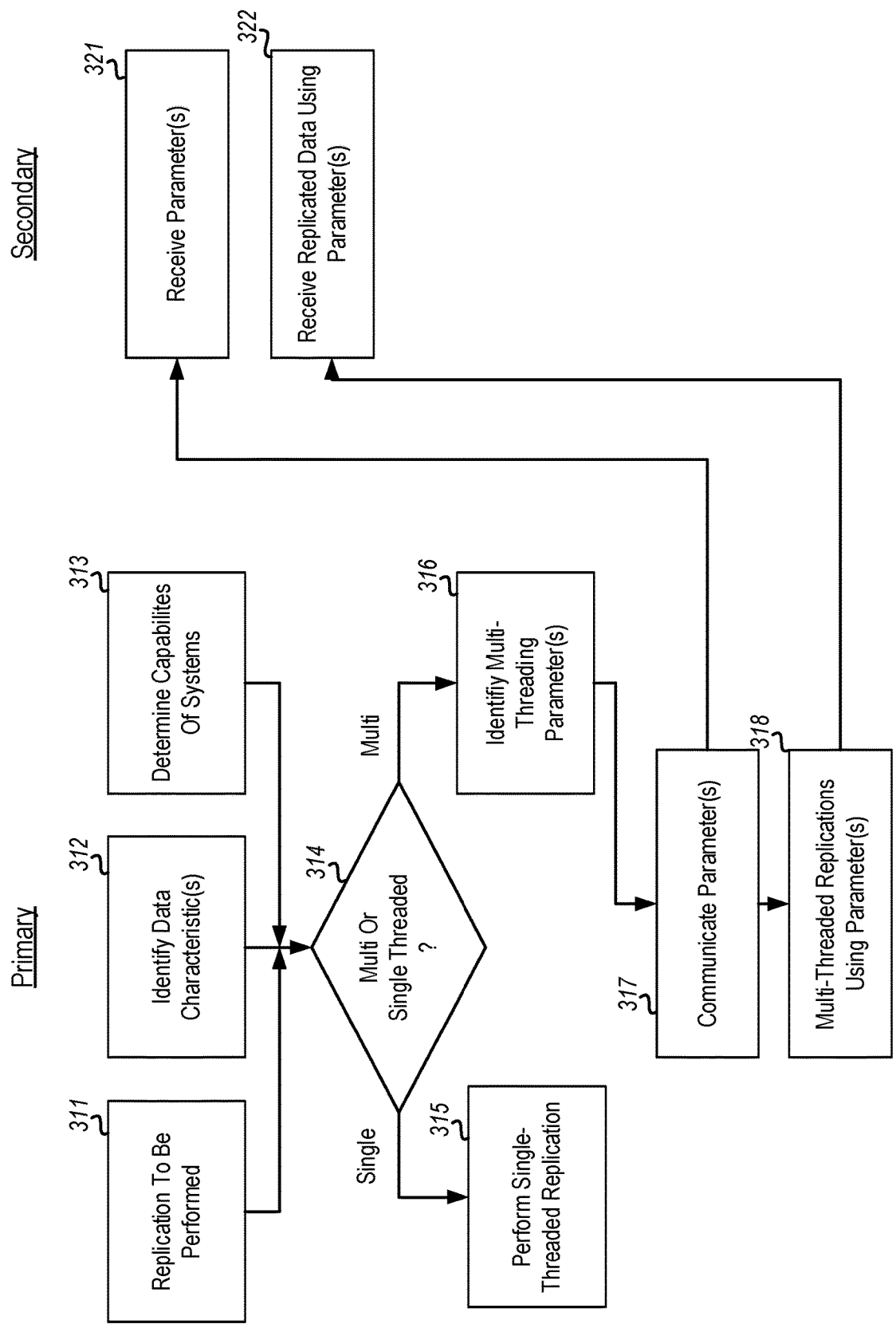
FIG. 3 illustrates a flowchart of a method for performing replication in a manner that depends on one or more characteristics of the data to be replicated, in accordance with the principles described herein.

In accordance with the principles described herein, the replication occurs in a manner that depends on one or more characteristics of the data to be replicated as part of the replication. FIG. 3 illustrates a flowchart of a method 300 for performing replication in a manner that depends on one or more characteristics of the data to be replicated, in accordance with the principles described herein. The method 300 may be performed to replicate the data 200 of FIG. 2 from the primary system 101 to the secondary system 102 in FIG. 1. Accordingly, the method 300 will now be described with respect to the environment 100 of FIG. 1 and the data 200 of FIG. 2.

The method 300 includes acts that are performed by the primary system (e.g., the primary system 101), which are illustrated in the left column of FIG. 3 under the heading "Primary" and have reference numbers in the 310's. Furthermore, the method 300 includes acts that are performed by the secondary system (e.g., the secondary system 102 of FIG. 1) which are illustrated in the right column of FIG. 1 under the heading "Secondary" and have reference numbers in the 320's. As an example, the acts performed by the primary system may be performed by the replica component 112 of the primary system 101, and the acts performed by the secondary system may be performed by the replication component 122 of the secondary system 102.

The method 300 includes determining that a replication of data is to be performed (act 211). As an example, the data range 200 of FIG. 2 may be the data to be replicated. The primary system 101 may initiate the replication in response to a request from the secondary system 102. Alternatively, the primary system 101 may initiate the replication without such a request. In any case, the replication component 112 on the primary system 101 determines that a replication of data is to be performed.

In accordance with the principles described herein, the replication is performed using different multi-threading parameters, depending on characteristics of the data to be replicated. Accordingly, the primary system determines one or more characteristics of the data to be replicated (act 312). As an example, the data 200 of FIG. 2 is the data to be replicated. The right cross-hatching represents that this data 200 has a particular set of characteristics.

In FIG. 3, the act 312 is shown in parallel with the act 311, which emphasizes that there is no time dependency between when the time that the one or more characteristics of the data are identified (act 312), and the time that the replication is determined to occur (act 311). For example, the data of that data region may be monitored continuously, periodically, or intermittently, such that the one or more characteristics of the data of the data range are known even prior to determining that the replication is to occur. On the other hand, the identification of the one or more characteristics may be deferred until after it is determined to replicate the data.

As an example, the characteristics could be variability in size of the partitionable portions of the data to be replicated. The characteristics could also be the data type of the data to be replicated in cases in which the data type is correlated with variability in the size of partitionable portions of the data of that data type. As an example, some key-value pairs may have predictable sizes in the value field (e.g., one kilobyte). On the other hand, some values may represent hash values and be of very large and unpredictable size.

Also, the primary system determines the multi-threading capabilities of the primary system and the secondary system (act 313). As an example, the multi-threading capabilities may be connected to the number of cores that the respective systems have. For instance, suppose that the primary system 101 has eight cores, but the secondary system 102 has four cores. From this, the primary system can conclude that the highest number of threads possible for the replication is four, governed by the computing system with the least number of cores. The primary and secondary systems agree upon the replication buffer size and number of buffers. For example, the secondary system might have lower memory available, say 100 MB, than the primary, say 200 MB. Both the systems will agree on using the lower value of 100 MB to replicate the data. During replication, the primary system also sends additional information for the size of data filled in a partition where the partition could be partially filled or empty. Note that the act 313 is shown in parallel with the acts 311 and 312 to emphasize that there is no time dependency between when the capabilities of the primary and secondary systems are determined (act 313), the time that the replication is determined to occur (act 311) and the time that the one or more characteristics of the data to be replicated are identified (act 312).

Based on the identified characteristic(s) of the data region and the multi-threading capabilities of both the primary system and the secondary system, the primary system determines whether to perform replication by multi-threading the replication (decision block 314). If the primary system determines to perform single-threaded replication ("Single" in decision block 314), then the primary system replicates the data using a single thread (act 315). Likewise, the secondary system is to receive the data using a single thread.

On the other hand, if the primary system determines to perform multi-threaded replication ("Multi" in decision block 314), the primary system identifies one or more multi-threading parameters that will be used to perform replication of the data region (act 316), communicates the multi-threading parameters to the secondary system (act 317), and also performs replication using the multi-threading parameters (act 318). From the perspective of the secondary system, the secondary system receives the multi-threading parameters (act 321), and also receives the replication using the same multi-threading parameters (act 322).

A simple example of multi-threading parameters is a number of threads to use when replicating. In one example, less variability in the size of the partition portions of data to be replicated tends the decision towards more aggressively using multi-threading (of course constrained at the upper end by the capabilities of the primary and secondary systems). Similarly, in this simple example, less variability in the size of partitions of data to be replicated tends the decision towards less aggressive multi-threading, or even single threaded replication.

FIG. 1 illustrates a primary system 101 replicating data to a single secondary system 102. However, the principles described herein may also be used to replicate from the primary system 101 to multiple secondary systems. Since the decision on whether to perform single-threaded or multi-threaded replication depends at least in part upon the capabilities of the secondary system that is the target of replication, it is possible that replication of the same region of data occurs by single threaded replication to one secondary system, and multi-threaded replication to another secondary system. Likewise, it is also possible that the same region of data is replicated by multi-threading, albeit with different multi-threading parameters, depending on the capabilities of the respective secondary systems. For instance, there may be one secondary with four cores, and thus multi-threaded replication may occur using four cores for that secondary system. However, multi-threaded replication might occur to another secondary using only two cores where that secondary only has two cores.

Figure 4A:
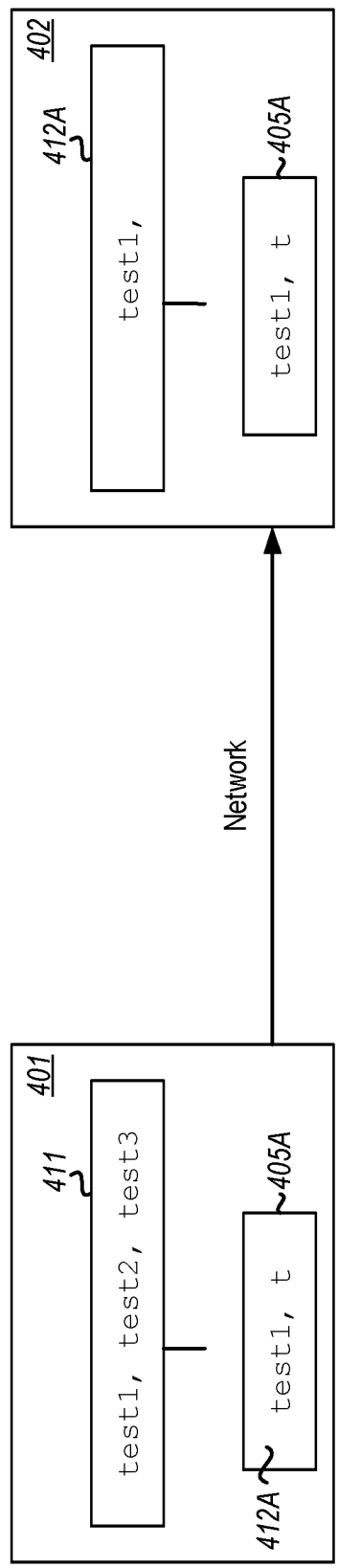
FIGS. 4A through 4C illustrate a sequence of transfers associated with replication of data from the memory of the primary system to the memory of a secondary system.
Figure 4B:
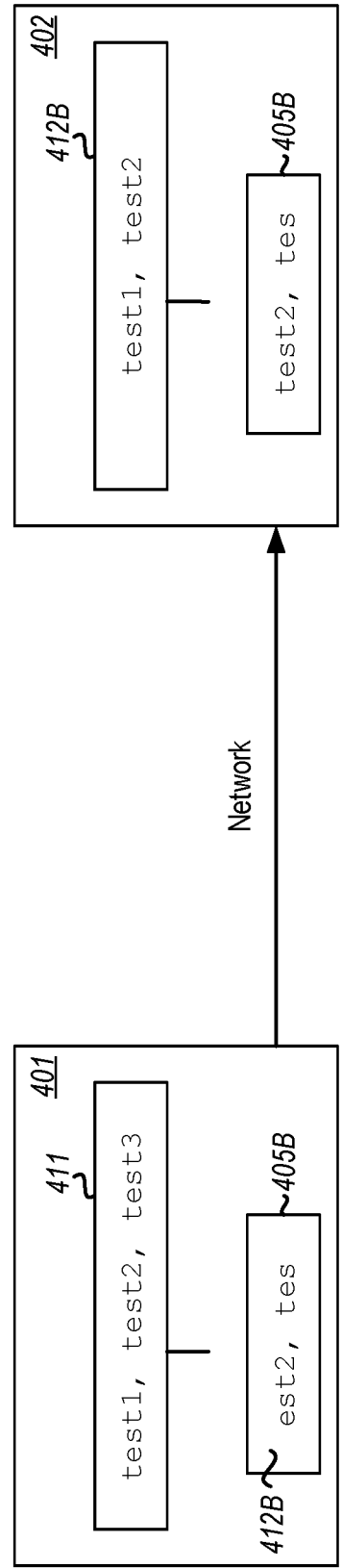
Figure 4C:
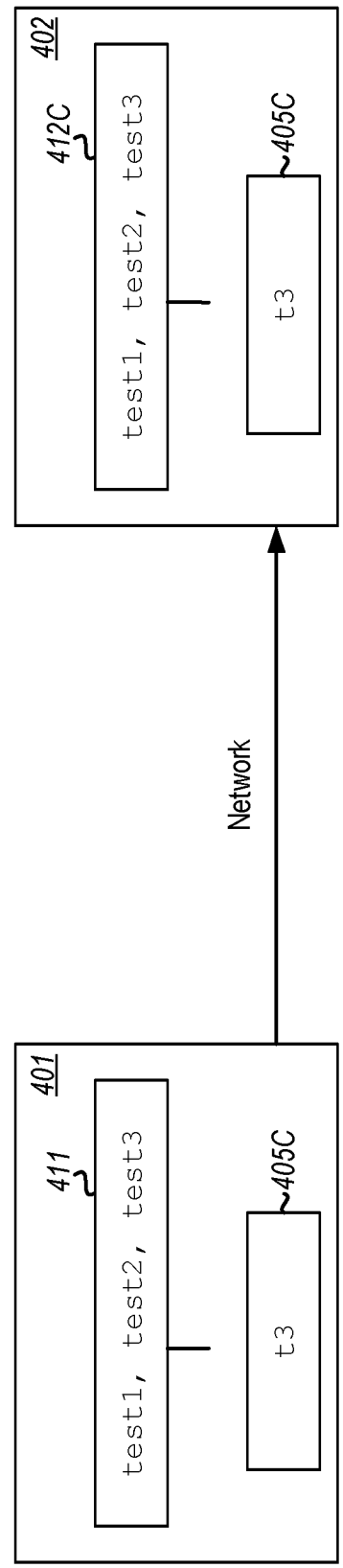

FIGS. 4A through 4C illustrates an example showing single threaded replication of data 411 from the volatile memory 401 of a primary system (such as the primary system 101) of FIG. 1 to the volatile memory 402 of a secondary system (such as the secondary system 102) of FIG. 1. The volatile memory 401 may also be referred to as the "primary memory", and the volatile memory 402 may also be referred to as the "secondary memory". In the example of FIGS. 4A through 4C, the string "test1, test2, test3" is to be replicated from the primary memory 401 to the secondary memory 402 in a buffer capable of holding 8 characters. In accordance with the method 300, the primary system decided to perform single threaded replication ("Single" in decision block 314), and negotiated this with the secondary system.

In FIG. 4A, the buffer 405A is populated with the first eight characters "test1, t", transferred over a network, and the data from the buffer provided as data 412A to the secondary memory 402. In FIG. 4B, the buffer 405B is populated with the next eight characters "est2, tes", is transferred over the network, and the characters are appended to the data 412A within the secondary memory 402 to formulate data 412B. In FIG. 4C, the buffer 405C is populated with the final characters "t3", is transferred over the network, and the characters are appended within to the previous data the secondary memory 402 to formulate the final data 412. The final data 412 within the secondary memory 402 is a replicated form of the original data 411 that is in the primary memory 401. This replication occurred using three network transfers over one connection.

FIGS. 5A and 5B illustrate an example showing multi-threaded replication of data 511 from the primary memory 401 to the secondary memory 402. In the example of FIGS. 5A and 5B, the data 511 in the form of values "test", "rest", "best" and "west" are to be replicated from the primary memory 401 to the secondary memory 402 in buffers that are partitioned in four parts. In this example, the primary system decides to perform multi-threaded replication ("Multi" in decision block 314), determines multi-threading parameter(s) in the form of the number of threads being four (act 316), and negotiates this number of threads with the secondary system (act 317). Thus, the primary system will use four threads to perform the replication, and likewise the secondary system will use four threads to perform the replication.

In FIG. 5A, the buffer 505A is partitioned into four parts 505A1, 505A2, 505A3 and 505A4, being equal in number to the number of threads to be used by each system for the replication. Accordingly, the primary system spins up four threads, and the secondary system spins up four threads. On the primary system, a thread is assigned to each of the parts of the buffer 505A. A first thread populates the first part 505A1 of the buffer 505A with the first two characters of the value "test" (in other words "te"). A second thread populates the second part 505A2 of the buffer 505A with the first two characters of the value "rest" (in other words "re"). A third thread populates the third part 505A3 of the buffer 505A with the first two characters of the value "best" (in other words "be"). A fourth thread populates the fourth part 505A4 of the buffer 505A with the first two characters of the value "west" (in other words "we").

The four threads transfer the appropriate parts of the buffer 505A. A first thread on the secondary system takes the content of part 505A1 ("te") and populates that into secondary memory 402. A second thread on the secondary system takes the content of part 505A2 ("re") and populates that into secondary memory 402. A third thread on the secondary system takes the content of part 505A3 ("be") and populates that into secondary memory 402. A fourth thread on the secondary system takes the content of part 505A4 ("we") and populates that into the secondary memory 402. The result of this first transfer over the network is the data 512A. Alternatively, as shown in FIG. 5A, each thread on the secondary system holds its respective data for assembling with other data prior to populating of that data into the secondary system.

In the next transfer, the first thread populates the first part 505B1 of the buffer 505B with the last two characters of the value "test" (in other words "st"). The second thread populates the second part 505B2 of the buffer 505B with the last two characters of the value "rest" (in other words "st"). The third thread populates the third part 505B3 of the buffer 505B with the last two characters of the value "best" (in other words "st"). The fourth thread populates the fourth part 505B4 of the buffer 505B with the last two characters of the value "west" (in other words "st"). The four threads of the primary system transfer the appropriate parts of the buffer 505B to the secondary system. The four threads of the secondary system each take the content of respective parts 505B1, 505B2, 505B3 and 505B4 and append that content onto the respective values to form data 512. The result of this second transfer over the network is the data 512, which is a replicated form of the original data 511.

Figure 6:
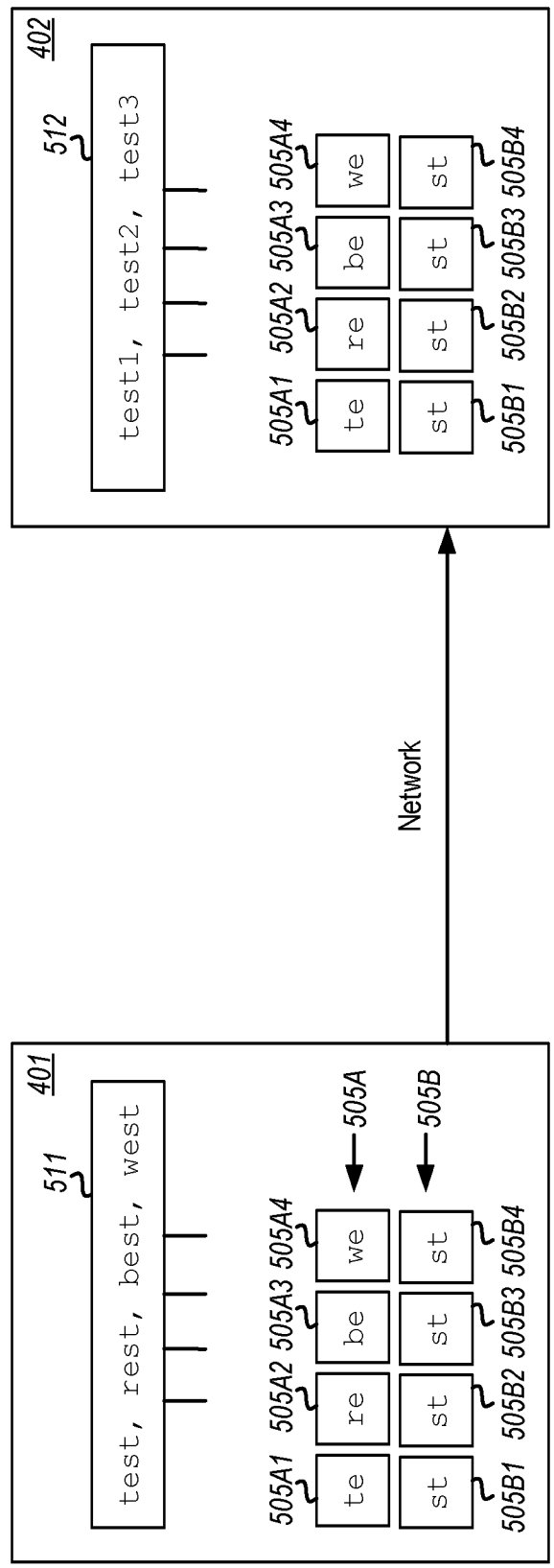
FIG. 6 illustrates a transfer from the primary memory to the secondary memory in which threads populate buffer parts for multiple buffers concurrently.

FIG. 6 illustrates an example showing multi-threaded replication of data 511 from the primary memory 401 to the secondary memory 402. Again, the data 511 in the form of values "test", "rest", "best" and "west" are to be replicated from the primary memory 401 to the secondary memory 402 using multiple buffers 505A and 505B. But now, the four threads populate the buffers concurrently. The buffers 505A and 505B are each partitioned in four parts. For example, like the FIG. 5A, buffer 505A is partitioned into parts 505A1 through 505A4, and buffer 505B is partitioned into parts 505B1 through 505B4.

In this example, the primary system decides to perform multi-threaded replication ("Multi" in decision block 314), and determines multi-threading parameter(s) in the form of the number of threads being four and the number of buffers per transfer being two (act 316), and negotiates this number of threads and buffers with the secondary system (act 317). Thus, the primary system will use four threads and two buffers to perform the replication as a single transfer, and likewise the secondary system will use four threads and two buffers to receive the replication.

A first thread populates the first part 505A1 of the first buffer 505A with the first two characters of the value "test" (in other words "te"), and the first part 505B1 of the second buffer 505B with the last two characters of the value "test" (in other words "st"). A second thread populates the second part 505A2 of the first buffer 505A with the first two characters of the value "rest" (in other words "re") and the second part 505B2 of the second buffer 505B with the last two characters of the value "rest" (in other words "st"). A third thread populates the third part 505A3 of the first buffer 505A with the first two characters of the value "best" (in other words "be"), and the third part 505B3 of the second buffer 505B with the last two characters of the value "best" (in other words "st"). A fourth thread populates the fourth part 505A4 of the first buffer 505A with the first two characters of the value "west" (in other words "we"), and the fourth part 505B1 of the buffer 505B with the last two characters of the value "west" (in other words "st").

The four threads transfer the appropriate parts of the buffers 505A and 505B. A first thread on the secondary system takes the content of part 505A1 ("te") and part 505B1 ("st"), assembles the content into value "test", and populates that value into secondary memory 402. A second thread on the secondary system takes the content of part 505A2 ("re") and part 505B2 ("st"), assembles the content into value "rest", and populates that value into secondary memory 402. A third thread on the secondary system takes the content of part 505A3 ("be") and part 505B3 ("st"), assembles the content into value "best", and populates that value into secondary memory 402. A fourth thread on the secondary system takes the content of part 505A4 ("we") and part 505B4 ("st"), assembles the content into value "west", and populates that value into the secondary memory 402. The result of this is the data 512, which is a replicated form of the original data 511.

In one embodiment of FIG. 6, each buffer part is sent as soon as it is filled. For instance, buffer part 505A2 might be sent as soon as it is filled, regardless of whether the other buffer parts are populated with respective data. In another embodiment of FIG. 6, each buffer is sent as soon as it is filled with the data. For instance, buffer 505A may be sent even though buffer 505B is not yet ready to be sent.

In another modification of FIG. 6, instead of using only one connection, there are multiple connections (e.g., SSL connections) used to transfer the various parts of the buffers. The number of connections may be negotiated in advance between the primary system and the secondary system. Here, the buffers 505A and 505B may be communicated concurrently over their distinct connections. Other examples of multi-threading parameters that may be communicated includes whether the data is an ordered set or an unordered set, and if ordered how the ordering is determined. Thus, the secondary computing system can reassemble ordered data in the proper order. The use of multiple connections helps to scale out the encryption and decryption load across multiple sockets.

Figure 7:
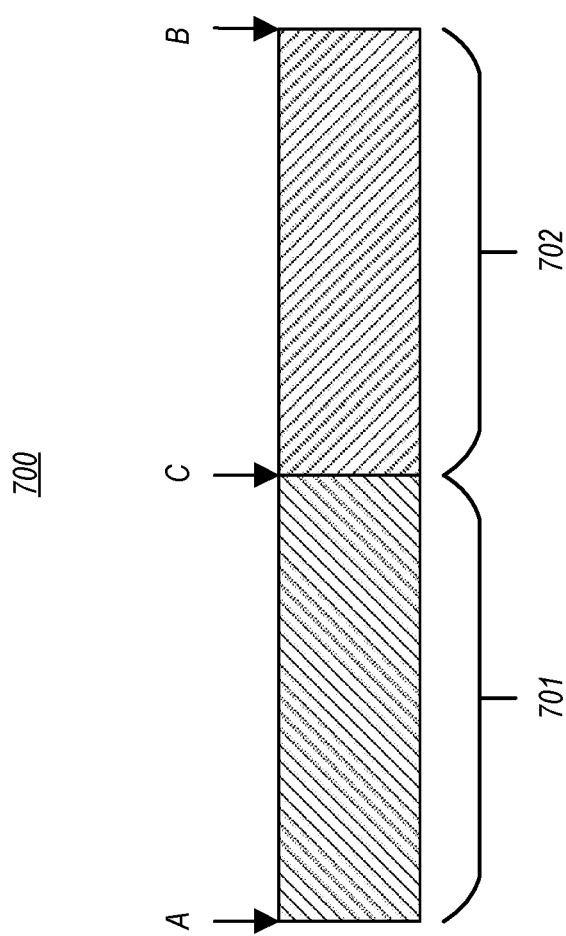
FIG. 7 illustrates data that has different characteristics.

Because the data 200 of FIG. 2 has the same set of characteristic(s), the decisions of whether to perform single-threaded or multi-threaded replication may be performed only once and applied across the entire data range of the data 200 for the given secondary system. Furthermore, if multi-threaded replication is to be performed, the same multi-threading parameters may be used to replicate the entire data range of the data 200 for that secondary system. However, FIG. 7 illustrates data 700 that has different characteristics.

For example, the data 700 ranges from point A to B. A first part 701 of that data 700 ranging from point A to C has a first set of one or more characteristics as represented by the rightward facing cross hatching. However, a second part 702 of the data 700 ranging from point C to B has a second set of one or more characteristics as represented by the leftward facing cross hatching.

Thus, the method 300 may be performed once for the first part 701, and once for the second part 702. Accordingly, the primary system may decide to replicate the first part 701 using single-threaded replication, and the second part 702 using multi-threaded replication, or vice versa. Alternatively, the primary system may decide to replicate the first part 701 using a first set of multi-threading parameters, and the second part 702 using a second set of multi-threading parameters.

Accordingly, what has been described is the replication of data from a primary computing system to a secondary computing system in a manner that the threading of the replication depends on one or more characteristics of the data to be replicated. This allows for replication to be performed more efficiently and in manner that is more suitable given the characteristics of the data being replicated. Of course, depending on the characteristics of the data within parts 701 and 702, the entirety of the data might be replicated in a single thread.

Because the principles described herein are performed in the context of a computing system, some introductory discussion of a computing system will be described with respect to FIG. 8. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
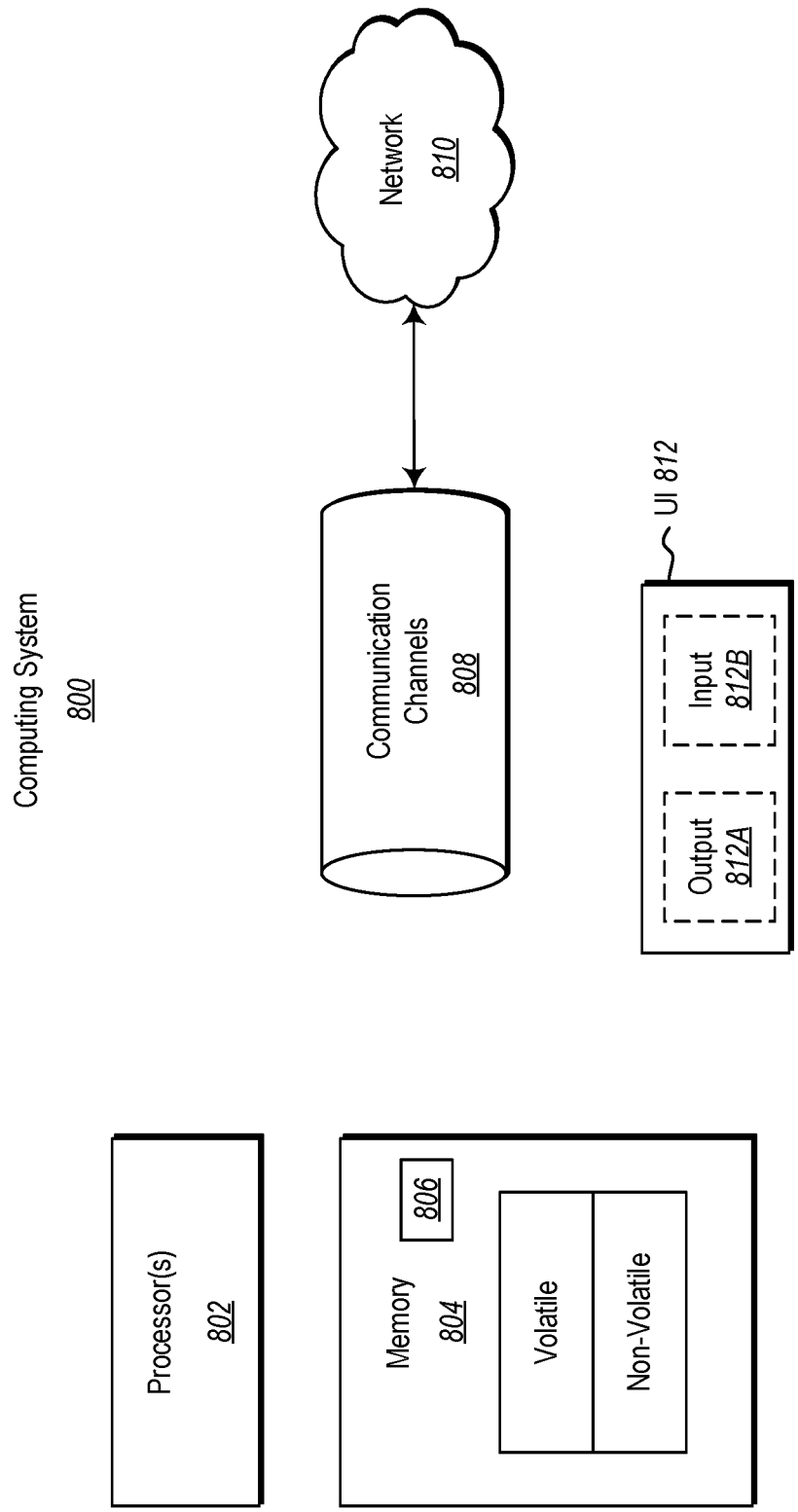
FIG. 8 illustrates an example computing system in which the principles described herein may be employed.

As illustrated in FIG. 8, in its most basic configuration, a computing system 800 includes at least one hardware processing unit 802 and memory 804. The processing unit 802 includes a general-purpose processor. Although not required, the processing unit 802 may also include a field programmable gate array (FPGA), an application specific integrated circuit (ASIC), or any other specialized circuit. In one embodiment, the memory 804 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 800 also has thereon multiple structures often referred to as an "executable component". For instance, the memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, virtual or augmented reality, holograms and so forth. Examples of input mechanisms 812B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NTC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A primary computing system that is configured to perform a replication to a secondary computing system, where the replication is dependent on one or more characteristics of at least some data that is to be replicated, the primary computing system comprising:

one or more processors; and one or more computer-readable hardware storage devices that store computer-executable instructions that are executable by the one or more processors to cause the primary computing system to:

identify one or more characteristics of a region of data that is to be replicated from the primary computing system to the secondary computing system;

determine multi-threading capabilities of the primary computing system;

determine multi-threading capabilities of the secondary computing system, wherein determining the multi-threading capabilities of the secondary computing system and of the primary computing system includes facilitating an agreement between the secondary computing system and the primary computing system regarding a number of buffers to use during an operation comprising a multi-threaded replication;

based on the identified one or more characteristics of the region of data and based on the multi-threading capabilities of both the primary computing system and the secondary computing system, decide to perform the multi-threaded replication of the data in the region using one or more multi-threading parameters;

communicate the one or more multi-threading parameters to the secondary computing system; and in response to the decision to perform the multi-threaded replication of the data in the region using the one or more multi-threading parameters, perform the multi-threaded replication of the data in the region using the one or more multi-threading parameters.

2. The primary computing system in accordance with claim 1, the one or more characteristics of the data being a data type of the data.

3. The primary computing system in accordance with claim 2, the region of data being all of the data within a defined replication scope on the primary computing system.

4. The primary computing system in accordance with claim 1, the one or more characteristics of the data being variation in partition sizes of the data.

5. The primary computing system in accordance with claim 1, the replication being a full replication from the primary computing system to the secondary computing system.

6. The primary computing system in accordance with claim 1, the one or more multi-threading parameters comprising a number of threads.

7. A method for performing a replication to a secondary computing system in a manner that depends on a data type of at least some data that is to be replicated as a part of the replication, said method comprising:

identifying one or more characteristics of a region of data that is to be replicated from a primary computing system to the secondary computing system;

determining multi-threading capabilities of the primary computing system;

determining multi-threading capabilities of the secondary computing system, wherein determining the multi-threading capabilities of the secondary computing system and of the primary computing system includes facilitating an agreement between the secondary computing system and the primary computing system regarding a number of buffers to use during an operation comprising a multi-threaded replication;

based on the identified one or more characteristics of the region of data and based on the multi-threading capabilities of both the primary computing system and the secondary computing system, deciding to perform the multi-threaded replication of the data in the region using one or more multi-threading parameters;

communicating the one or more multi-threading parameters to the secondary computing system; and in response to the decision to perform the multi-threaded replication of the data in the region using the one or more multi-threading parameters, performing the multi-threaded replication of the data in the region using the one or more multi-threading parameters.

8. The method in accordance with claim 7, the one or more characteristics of the data being variation in partition sizes of the data.

9. The primary computing system of claim 1, wherein the number of buffers that will be used during the operation comprising the multi-threaded replication is agreed to be more than one buffer.

10. The method in accordance with claim 7, the one or more characteristics of the data being a data type of the data.

11. The method in accordance with claim 7, the multi-threaded replication comprising:

identifying a plurality of threads to be used in the replication;

partitioning the data into a plurality of parts; and assigning the plurality of parts to corresponding threads of the plurality of threads.

12. The method in accordance with claim 7, the region of data being a first region of data, the one or more characteristics being first one or more characteristics, the method further comprising:

identifying second one or more characteristics of data a second region of data to be replicated from the primary computing system to the secondary computing system;

based on the second one or more characteristics of the data of the second region of data, deciding to perform single-threaded replication of the second region of data; and in response to the decision to perform single-threaded replication of the second region of data, performing single-threaded representation of second region of data.

13. The method in accordance with claim 12, the first one or more characteristics comprising a variability in size of partition portions of the data of the first data region and the second one or more characteristics comprising a variation in size of partition portions of data of the second data region, the decision on whether to multi-thread or single-thread replication being based at least in part on the variation in size of the partition portions of the associated data region, the variation in size of partition portions of the data of the first data region being less than the variation in size of partition portions of data of the second data region.

14. The method in accordance with claim 12, the replication of the second region of data and the replication of the first region of data being at least part of a full replication from the primary computing system to the secondary computing system.

15. The method in accordance with claim 12, the replication of the second region of data occurring in a different replication operation as the replication of the first region of data.

16. The method in accordance with claim 7, the region of data being a first region of data, the one or more characteristics being first one or more characteristics, the one or more multi-threading parameters being first one or more multi-threading parameters, the method further comprising:

identifying second one or more characteristics of the second region of data to be replicated within at least part of a replication from the primary computing system to the secondary computing system;

based on the identified one or more characteristics of the data of the region of data and multi-threading capabilities of both the primary computing system and the secondary computing system, deciding to perform multi-threaded replication of the region of data using one or more multi-threading parameters, and communicating the one or more multi-threading parameters to the secondary computing system; and in response to the decision to perform multi-threaded replication of the second region of data using the second one or more multi-threading parameters, performing multi-threaded replication of the second region of data using the second one or more multi-threading parameters.

17. The method in accordance with claim 7, the one or more multi-threading parameters comprising a number of threads.

18. The method in accordance with claim 7, the one or more multi-threading parameters comprising a maximum size of data to be handled by each thread.

19. The method in accordance with claim 7, the one or more multi-threading parameters comprising an ordering of data within the region of data.

20. The method in accordance with claim 7, the computing system further configured to determine a variability in size of partitionable portions of the identified data type, the decision on whether to multi-thread or single-thread the replication being based at least in part on the variability in size of the partitionable portions of the identified data type.

21. A primary computing system that is configured to perform a full replication to a secondary computing system, said replication being performed in a manner that is dependent on a data type of data that is to be replicated, the primary computing system comprising:

one or more processors; and one or more computer-readable hardware storage devices that store instructions that are executable by the one or more processors to cause the primary computing system to:

identify a data type of a region of data that is to be replicated within the full replication from the primary computing system to the secondary computing system;

determine a variability in size of partitionable portions of the identified data type;

determine multi-threading capabilities of the primary computing system;

determine multi-threading capabilities of the secondary computing system, wherein determining the multi-threading capabilities of the secondary computing system and of the primary computing system includes facilitating an agreement between the secondary computing system and the primary computing system regarding a number of buffers to use during an operation comprising a multi-threaded replication;

based on the determined variability of the identified data type and based on the multi-threading capabilities of both the primary computing system and the secondary computing system, decide to perform the full replication of the data in the region using one or more threading parameters, wherein the one or more threading parameters include whether to multi-thread or single-thread the full replication;

communicate the one or more threading parameters to the secondary computing system; and in response to deciding to perform the full replication of the data in the region using the one or more threading parameters, perform replication of the data in the region using the one or more threading parameters.

* * * * *